United States Patent [19]

Shirey

[11] 4,083,608
[45] Apr. 11, 1978

[54] AIR COMPRESSOR LAY-OVER CONTROL CIRCUIT

[75] Inventor: Frank W. Shirey, North Huntingdon, Pa.

[73] Assignee: Westinghouse Air Brake Company, Wilmerding, Pa.

[21] Appl. No.: 734,386

[22] Filed: Oct. 21, 1976

[51] Int. Cl.² ............................................. B60T 17/02
[52] U.S. Cl. .................................... 303/11; 303/86; 417/1
[58] Field of Search ............... 303/1, 3, 10, 11, 28, 303/57, 59, 60, 67, 86, 84 R, 2; 417/1, 44; 188/2 R

[56] References Cited

U.S. PATENT DOCUMENTS

| 1,376,411 | 5/1921 | Eaton | 417/44 X |
| 1,709,871 | 4/1929 | Parke | 303/11 X |
| 1,711,641 | 5/1929 | Hewitt | 303/11 X |
| 2,038,184 | 4/1936 | McCune | 417/44 X |
| 2,118,130 | 5/1938 | Aikman | 417/44 X |

Primary Examiner—Trygve M. Blix
Assistant Examiner—Douglas C. Butler
Attorney, Agent, or Firm—R. S. Visk; R. W. McIntire, Jr.

[57] ABSTRACT

A control circuit for reducing the output cycle of a compressed air system of a rapid transit car during "lay-over" periods, when only a minimum of compressed air for a parking brake, for example, is needed by the car, by activating a secondary governor set for a low pressure operating range and connected in series with a primary governor, one or the other of the governors being activated by the control circuit responsively to control signals denoting the state of compressed air requirement of the car.

4 Claims, 2 Drawing Figures

AIR COMPRESSOR LAY-OVER CONTROL CIRCUIT

BACKGROUND OF THE INVENTION

In rail rapid transit service, a large percentage of the available cars are placed in "lay-over" status or service between peak operating periods, during which time the compressed air supply system normally remains activated to provide compressed air primarily for a parking brake. Due to normal leakage associated with such compressed air supply systems, the air compressor periodically operates to maintain the system air pressure within the operating range required during normal operation, such as 130–150 psi, for example. Accordingly, compressor operation occurs on a relatively heavy duty cycle which results in excessive compressor and motor wear.

SUMMARY OF THE INVENTION

The object of the present invention, therefore, is to provide a simplified, low-cost means for automatically changing over cyclical compressor operation from a normal higher pressure range of operation to a low pressure range of operation during such time that the car is on stand-by or lay-over status.

Briefly, the invention is intended for use in a compressed air system of a rapid transit vehicle for reducing compressor operation and output, when the vehicle is sitting on a siding on a stand-by or lay-over status, to a minimum at which only compressed air at a pressure necessary for maintaining the parking brakes, for example, is maintained, said invention comprising the use of a secondary governor device set to operate at a lower pressure range, that is, sufficient for minimum needs of a stand-by vehicle, than that of the primary governor device which controls normal compressed air supply, that is, at a higher pressure necessary during full operation of the car. The secondary governor device, which is connected in series with the primary governor device and is set to operate at a lower pressure range than the primary governor device, is operably actuated by a control device which, in turn, senses certain conditions, such as absence of brake pipe pressure, for example, when the vehicle is sitting, said secondary governor device being responsive to lower main reservoir pressure range and, therefore, taking over control of compressor operation, while the primary governor device, not being responsive to the lower reservoir pressure range, remains inactively subservient to the secondary governor until the vehicle is placed in full service, at which time the brake pipe is charged and the secondary governor device is made subservient to the primary governor device. The invention may be set up to function either pneumatically or electrically.

DESCRIPTION AND OPERATION

Figure 1:
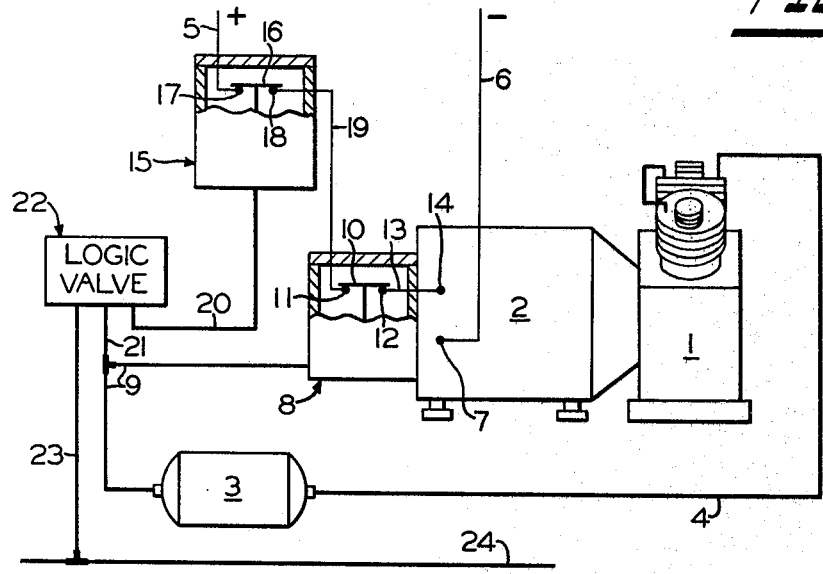
FIG. 1 is a schematic view, partially in section, of a compressed air system embodying the invention.

A compressed air system embodying the invention is shown in FIG. 1 and comprises an air compressor 1 driven by an electric motor 2. Compressed air from compressor 1 is stored in a storage reservoir 3 via a pipe 4.

Electrical energy for driving motor 2 is transmitted via an electrical circuit comprising electrical conductors 5 and 6, the latter of said conductors being connected to a terminal 7 of said motor. Cyclical operation of motor 2, and therefore of compressor 1 is normally controlled by a primary governor device 8 connected via a pipe 9 to main reservoir 3, said primary governor device being set to operate in conventional manner in response to pressure in said reservoir for normally maintaining reservoir pressure within upper and lower limits of a certain high pressure range, such as 120 psi to 150 psi, for example, compatible with the compressed air needs of the vehicle during full service operation.

Primary governor device 8 includes a fluid pressure operable electrical switch 10 normally biased to a closed position, in which a pair of contacts 11 and 12 are connected when pressure in reservoir 3, and therefore acting in said primary governor device, has been reduced to the lower pressure setting or limit of 120 psi. When pressure in reservoir 3 attains the upper pressure setting or limit of 150 psi, switch 10 is operated to an open position in which contacts 11 and 12 are disconnected. Contact 12 is connected via an electrical conductor 13 to a terminal 14 of motor 2.

According to the invention, a secondary governor device 15 is electrically connected in series with primary governor device 8, and is pneumatically communicable with reservoir 3 in a manner to be hereinafter disclosed. Secondary governor device 15 operates in similar manner as primary governor device 8, but within upper and lower limits of a certain low pressure range, as for example 80 psi to 120 psi. Secondary governor device 15 includes a fluid pressure operable electrical switch 16 normally biased to a closed position, in which a pair of contacts 17 and 18 are connected when pressure in reservoir 3, and therefore acting in the secondary governor, has reduced to the lower pressure setting or limit of 80 psi or less. When pressure in reservoir 3 attains the upper pressure setting or limit of 120 psi, switch 16 is operated to an open position in which contacts 17 and 18 are disconnected. Contact 17 is connected to conductor 5, while contact 18 is connected via an electrical conductor 19 to contact 11 of primary governor device 8.

Thus, conductor 5, contact 17, switch 16, contact 18, conductor 19, contact 11, switch 10, contact 12, conductor 13, terminal 14, terminal 7, and conductor 6 are all connected in series to form an electrical power circuit which, when closed, comprises an electrical energy source by which motor 2 is energized for driving compressor 3.

Secondary governor device 15 is communicable with reservoir 3 via a delivery pipe 20 and a branch supply pipe 21 connected to pipe 9. Communication between pipes 20 and 21, and therefore between reservoir 3 and secondary governor device 15, is controlled by brake monitoring means comprising a logic valve device 22 interposed between said pipes. Logic valve device 22 is connected via a control pressure pipe 23 to a brake pipe 24 of the car and is thereby able to sense whether the brake apparatus of the car is in a running-vehicle condition or has been set for a parked-vehicle condition, as will be more fully explained hereinafter.

Logic valve device 22 is known in the fluidic art as a "NOR" valve, which when provided with a control pressure or signal (via pipe 23) operates to interrupt communication between supply pipe 21 and delivery pipe 20. In the absence of a control signal, logic valve 22 operates to communicate pipe 21 with pipe 20 and therefore reservoir 3 with secondary governor device 15.

In considering the operation of the above-described compressed air system, let it be assumed that the car on which the system is mounted is connected in a train which at the time is in running service. In this case brake pipe 24 is connected from car to car throughout the train and is normally charged with fluid pressure, thereby denoting a moving or full-service condition of the car, thus providing control pressure via pipe 23 to logic valve device 22 to cause said logic valve to cut off communication between pipes 21 and 20 and therefore pressure from reservoir 3 to secondary governor device 15.

In the absence of pressure from reservoir 3 acting on secondary governor device 15, said governor device, as long as such condition prevails, remains in an inactive state with switch member 10 in its closed position. With secondary governor device 15 in an inactive state, primary governor 8, with the higher pressure operating range, takes over control of cyclical operation of motor 2 and compressor 3 for maintaining pressure in reservoir 3 at the higher range of 120 psi to 150 psi necessary for full service operation.

If it be assumed that the car on which the abovedescribed compressed air system is mounted, is parked on a siding in a parked-vehicle or lay-over status, brake pipe 24 is void of fluid pressure, and therefore control pressure for logic valve device 22 via pipe 23 is also absent, thereby denoting a standing or parked condition of the car. Logic valve device 22, as was above described, operates to connect pipes 21 and 20 and, in turn, pressure in reservoir 3 to secondary governor device 15. Since secondary governor device 15, as was above explained, operates responsively to the lower pressure range of 80 psi to 120 psi, said secondary governor device takes over cyclical operation of motor 2 and compressor 3 for maintaining pressure in said reservoir within said lower pressure operating range, which is sufficient for any requirements, such as operating the parking brakes, while the car is in the lay-over status. Primary governor device 8 thus remains inactive during the lay-over period of the car.

Figure 2:
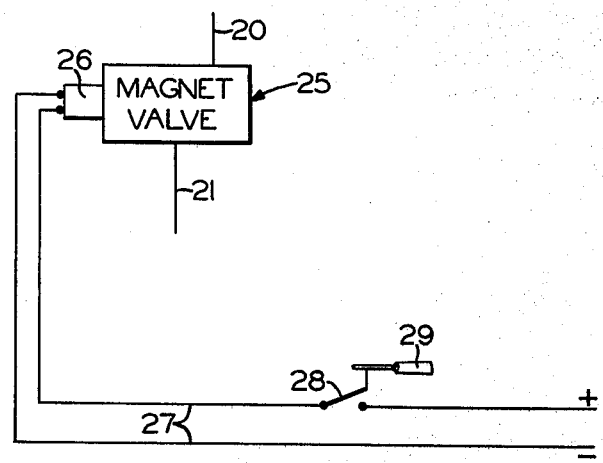
FIG. 2 is a fragmentary view of a compressed air system comprising a modified embodiment of the system shown in FIG. 1.

As shown in FIG. 2, the compressed air system shown in FIG. 1 and above described may be modified by replacing logic valve device 22 with a magnet valve device 25 which, similarly to said logic valve device, is operably interposed between pipes 21 and 20 for controlling communication therebetween by sensing the condition of the brake apparatus.

Magnet valve device 25 is provided with a solenoid 26 connected in an electrical brake control circuit 27 connected to an engineer's brake valve device (not shown). A switch member 28 is interposed in circuit 27 and may be operably connected to an operating handle 29 (represented symbolically in the drawing) of the engineer's brake valve device, for example, or to some other convenient means.

When switch member 28 is in an open position, in which it is shown, and in which circuit 27 is open, solenoid 26 is deenergized for operating magnet valve device to an open position in which pipe 21 is in communication with pipe 20, and, of course, when said swtich member and circuit are closed, said solenoid is energized for operating said magnet valve device to a closed position in which said communication is interrupted. The system operates similarly as described above when logic valve device 22 effects communication and interruption thereof between pipes 21 and 20.

Operating handle 29 is conveniently adaptable for operating switch member 28 in that the switch member may be arranged such that when the handle is moved in the direction indicated by the arrow in FIG. 2 to a "handle-off" position, switch member 28 is moved to an open position. The "handle-off" position is particularly convenient because the engineer must operate handle 29 to said "handle-off" position before he leaves the parked vehicle, and in said "handle-off" position he may remove the handle from the brake valve, which he is also required to do before leaving the parked vehicle unattended.

It should be obvious, that if desired, solenoid 26 and magnet valve device 25 could be arranged such that energization of the solenoid would effect operation of said magnet valve device to its open position and deenergization would effect operation of the magnet valve device to its closed positions with the results as above described. In this case, switch 28 would be arranged with handle 29 so as to be operated to a closed position when said handle is operated to the "handle-off" position. This latter arrangement would provide for automatic activation of the secondary governor device 15 in the event of electrical power failure, in which the car brakes are also automatically applied.

Having now described the invention, what I claim as new and desire to secure by Letters Patent, is:

1. Control apparatus for controlling compressor operation of a compressed air system of a railway vehicle cooperatively with brake apparatus of the vehicle including a brake pipe normally charged with fluid pressure during a running-vehicle condition, and being void of said fluid pressure during a parked-vehicle condition, said control apparatus comprising:
    (a) an air compressor;
    (b) driving means for driving said compressor;
    (c) a storage reservoir for storing compressed air output from the compressor;
    (d) power circuit means providing energy for said driving means;
    (e) primary governor means serially interposed in said power circuit means for maintaining compressor output within upper and lower limits of a high pressure range;
    (f) secondary governor means serially interposed in said power circuit means in serial relation with said primary governor means for maintaining said compressor output within upper and lower limits of a low pressure range; and
    (g) monitoring means operably connected to said brake apparatus for sensing the braking condition thereof and including a logic valve device having a control pressure input connected to said brake pipe, said logic valve device being operable responsively to a control pressure signal from the brake pipe during said running-vehicle condition, to a closed position in which communication between said reservoir and said secondary governor means is cut off and said primary governor means is activated exclusively of said secondary governor means, and being operable, in the absence of said control pressure signal during said parked-vehicle condition, to an open position in which said communication is opened for activating said secondary governor means exclusively of said primary governor means.

2. Control apparatus, as set forth in claim 1, wherein said power circuit means comprises an electrical energy circuit, and said secondary governor means comprises a first fluid pressure operable electrical switch serially interposed in said energy circuit.

3. Control apparatus, as set forth in claim 2, wherein said first fluid pressure operable switch is operable to an open position in response to pressure in said reservoir at said upper limit of the low pressure range, and being operable to a closed position in response to pressure in said reservoir at said lower limit of the low pressure range.

4. Control apparatus, as set forth in claim 3, wherein said upper and lower limits of said low pressure range are respectively lower than said upper and lower limits of said high pressure range.

* * * * *